United States Patent
Pinel et al.

(10) Patent No.: US 11,270,353 B2
(45) Date of Patent: Mar. 8, 2022

(54) VISUALLY AND/OR SEMANTICALLY INTEGRATING A DIGITAL ADVERTISEMENT WITHIN A DIGITAL COMPOSITION

(71) Applicant: International Business Machines Corporation, Armonk, NY (US)

(72) Inventors: Florian Pinel, New York, NY (US); Robert N. Redmond, Smyrna, GA (US); Edward E. Seabolt, Georgetown, TX (US); William S. Spann, III, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 520 days.

(21) Appl. No.: 15/819,252

(22) Filed: Nov. 21, 2017

(65) Prior Publication Data

US 2019/0156375 A1    May 23, 2019

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0276* (2013.01)

(58) Field of Classification Search
CPC .............. G06Q 30/0276; G06Q 30/0207–0277
See application file for complete search history.

(56) References Cited

U.S. PATENT DOCUMENTS

| | | | |
|---|---|---|---|
| 6,829,780 B2 | 12/2004 | Kraft et al. | |
| 7,028,072 B1 | 4/2006 | Kliger et al. | |
| 7,971,136 B2 | 6/2011 | Menachem et al. | |
| 7,987,194 B1 | 7/2011 | Walker et al. | |
| 8,165,915 B1* | 4/2012 | Lucash | G06Q 40/00 705/14.72 |
| 8,417,568 B2 | 4/2013 | Nong et al. | |
| 2007/0192794 A1* | 8/2007 | Curtis | H04N 7/163 725/42 |
| 2008/0301100 A1* | 12/2008 | Wroblewski | G06F 16/951 |
| 2011/0060794 A1 | 3/2011 | Sweeney | |

(Continued)

OTHER PUBLICATIONS

Brachmann; Computational and Experimental Approaches to Visual Aesthetics; Computational Neuroscience; 17 pages; Nov. 14, 2017.*

(Continued)

*Primary Examiner* — Radu Andrei
(74) *Attorney, Agent, or Firm* — Cantor Colburn LLP; Rob Bean

(57) ABSTRACT

A method includes determining, by a controller, characteristics of a hosting digital composition, wherein the digital composition hosts a digital advertisement. The method also includes dynamically modifying at least one characteristic of the digital advertisement based at least on the determined characteristics of the hosting digital composition to create a modified digital advertisement. The modifying the at least one characteristic of the digital advertisement configures the digital advertisement to be visually and/or semantically integrated within the hosting digital composition. The method also includes displaying the modified digital advertisement within the hosting digital composition.

20 Claims, 3 Drawing Sheets

(56) References Cited

U.S. PATENT DOCUMENTS

| | | | |
|---|---|---|---|
| 2011/0231252 A1* | 9/2011 | Sattaru | G06Q 30/0277 |
| | | | 705/14.49 |
| 2012/0030005 A1 | 2/2012 | Gupta | |
| 2012/0089933 A1* | 4/2012 | Garand | G06F 8/38 |
| | | | 715/765 |
| 2012/0158504 A1 | 6/2012 | Kumar et al. | |
| 2013/0145256 A1 | 6/2013 | Padala et al. | |
| 2013/0246909 A1* | 9/2013 | Carroll | G06F 40/154 |
| | | | 715/235 |
| 2014/0071149 A1 | 3/2014 | Chu et al. | |
| 2014/0188636 A1 | 7/2014 | Vandyke et al. | |
| 2015/0046789 A1 | 2/2015 | Wei et al. | |
| 2015/0100869 A1* | 4/2015 | Sunshine | G06F 3/0488 |
| | | | 715/205 |
| 2016/0110082 A1* | 4/2016 | Zhang | G06F 40/106 |
| | | | 715/765 |

OTHER PUBLICATIONS

Sjoebergh; A Visualization-Analytics-Interaction Workflow . . . ; Cof Information Visualisation; 2015; pp. 300-309; 2015.*
"GEMINI Yahoo Advertising." Yahoo!, Yahoo!, advertising.yahoo.com/solutions/gemini. Retrieved Nov. 21, 2017, 2 pages.
TIGERcolor "Basic color schemes—Introduction to Color Theory"; retrieved at: https://www.tigercolor.com/color-lab/color-theory/color-theory-intro.htm; on Apr. 27, 2020; 5 pgs.

* cited by examiner

VISUALLY AND/OR SEMANTICALLY INTEGRATING A DIGITAL ADVERTISEMENT WITHIN A DIGITAL COMPOSITION

BACKGROUND

One or more embodiments relate in general to visually and/or semantically integrating a digital advertisement within a digital composition. More specifically, one or more embodiments relate to visually and/or semantically integrating a digital advertisement with elements of the digital composition in which the digital advertisement appears.

Digital advertising is a method of marketing and advertising which uses digital compositions such as, for example, webpages, imagery of mobile applications, digital documents, and/or digital billboards) to present promotional materials and marketing messaging to viewers. Viewers of the digital advertisements can have a negative reaction because the viewers can consider the digital advertisements to be intrusive and distracting.

SUMMARY

According to one or more embodiments, a method includes determining, by a controller, characteristics of a hosting digital composition. The digital composition hosts a digital advertisement. The method also includes dynamically modifying at least one characteristic of the digital advertisement based at least on the determined characteristics of the hosting digital composition to create a modified digital advertisement. Modifying the at least one characteristic of the digital advertisement configures the digital advertisement to be visually and/or semantically integrated within the hosting digital composition. The method also includes displaying the modified digital advertisement within the hosting digital composition.

According to one or more embodiments, a computer system includes a memory. The computer system also includes a processor system communicatively coupled to the memory. The processor system is configured to perform a method including determining characteristics of a hosting digital composition. The digital composition hosts a digital advertisement. The method also includes dynamically modifying at least one characteristic of the digital advertisement based at least on the determined characteristics of the hosting digital composition to create a modified digital advertisement. Modifying the at least one characteristic of the digital advertisement configures the digital advertisement to be visually and/or semantically integrated within the hosting digital composition. The method also includes displaying the modified digital advertisement within the hosting digital composition.

According to one or more embodiments, a computer program product includes a computer-readable storage medium having program instructions embodied therewith. The computer-readable storage medium is not a transitory signal per se, the program instructions readable by a processor system to cause the processor system to perform a method including determining characteristics of a hosting digital composition. The digital composition hosts a digital advertisement. The method also includes dynamically modifying at least one characteristic of the digital advertisement based at least on the determined characteristics of the hosting digital composition to create a modified digital advertisement. Modifying the at least one characteristic of the digital advertisement configures the digital advertisement to be visually and/or semantically integrated within the hosting digital composition. The method also includes displaying the modified digital advertisement within the hosting digital composition.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
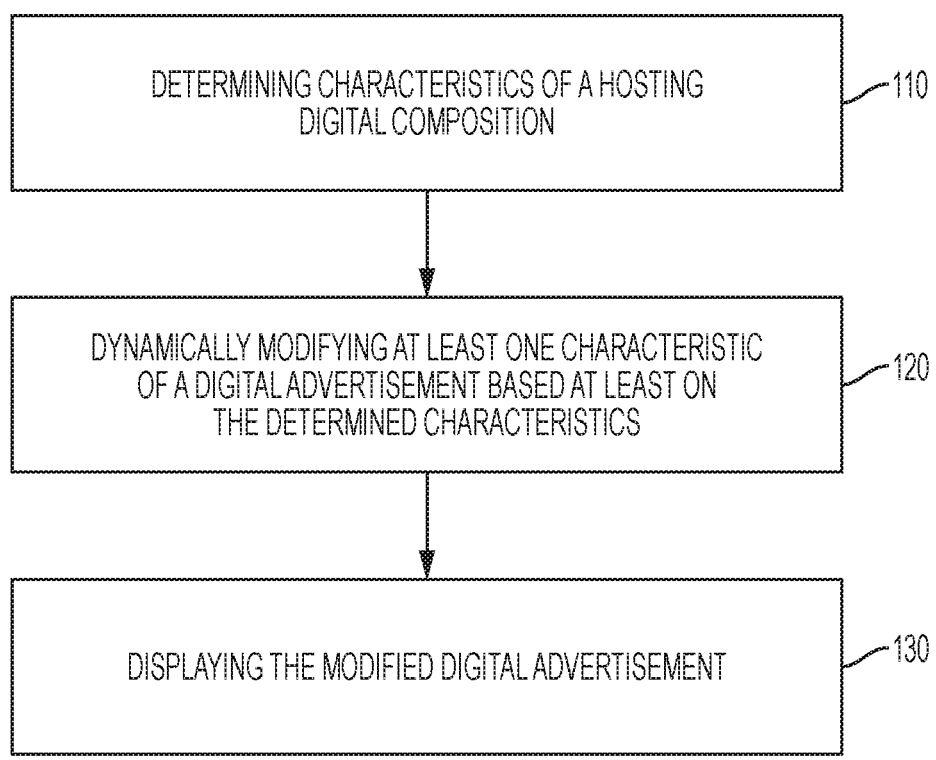
FIG. 1 depicts a flowchart of a method in accordance with one or more embodiments.

In accordance with one or more embodiments, methods and computer program products for visually and/or semantically integrating a digital advertisement within a digital composition are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

As described above, viewers of digital advertisements often dislike these digital advertisements. For example, website visitors often dislike online advertisements that appear on the websites that they visit. One reason why viewers dislike digital advertisements is because of the appearance of these advertisements. An appearance of an advertisement can clash with the digital composition upon which the advertisement appears. For example, a digital advertisement can clash with the webpage, mobile application imagery, digital documents, and/or digital billboards upon which the digital advertisement appears. In another example, a digital advertisement billboard can clash with its surroundings. As such, the advertisement with the clashing appearance can be considered to be an eyesore that causes annoyance to both the viewers and to the owner of the digital composition.

Although advertisement designers are aware that the appearance of advertisements often clash with the digital compositions upon which the advertisements appear, with the conventional approaches, the designers are often unable to solve the problem because modifying the advertisements to better integrate with the surrounding elements of the digital composition is a manual process that can be time-consuming and difficult to perform. In order to perform the manual process of modifying an advertisement in accordance to the conventional approaches, a designer generally has to first determine the style of elements of the digital composition upon which the advertisement appears. Only then can the designer manually apply the determined style to the advertisement. If the advertisement is to be hosted across different digital compositions (and is to be stylistically integrated with each of the different digital compositions), then the designer may have to redesign the advertisement for each of the different digital compositions. Further, in cases of programmatic advertising, a webpage upon which the advertisement appears is not known in advance. As such, with the conventional approaches, the designer often does not have any opportunity to redesign the advertisement based on the webpage upon which the advertisement appears.

As described above, the clashing appearance of an advertisement can cause visitors to dislike the advertisement. Additionally, the arrangement of the advertisement relative to the other content/elements of the digital composition can also cause visitors to dislike the advertisement. An advertisement can be placed/arranged within the digital composition in manner that does not give proper consideration to the other content/elements of the digital composition. In other words, digital advertisements often do not contextually fit within the digital composition. Issues relating to arrangement and placement of objects within a digital composition can be generally referred to as semantic issues.

Digital advertisements generally do not contextually fit within the digital compositions in which they appear because the advertisements are generally positioned within predefined slots within the digital compositions (e.g., such as within predefined slots within a webpage). In order to contextually arrange an advertisement within the digital composition in which the advertisement appears, the advertisement may need to be positioned at an area of the digital composition that is different from a predefined slot. If an advertisement is able to be visually and semantically integrated with a digital composition, the advertisement can be more effective in increasing sales and accrued revenue.

In view of the above shortcomings with the conventional approaches, one or more embodiments are directed to a method of modifying advertisements to be visually and/or semantically integrated within the digital compositions in which the advertisements appear (i.e., the digital compositions that host the advertisements). One or more embodiments can inspect a hosting composition in order to determine characteristics of the hosting composition. For example, one or more embodiments can inspect a hosting webpage in order to determine the characteristics of the hosting page. In one embodiment, the advertisement itself can be a self-contained module that performs the function of parsing and inspecting the hosting page in order to determine the characteristics of the hosting page. In another embodiment, a server that provides the advertisement can be configured to perform the function of parsing and inspecting the hosting page. Further, in another embodiment, the server that hosts the digital composition can be configured to perform the function of parsing and inspecting the hosting composition. When inspecting the hosting composition, one or more embodiments can determine a typography, a font, a typography size, a typographic hierarchy, a background, a color palette, a system of how digital composition elements are semantically arranged, a set of images, and a color tone of the hosting composition. Colors within images of hosting compositions can also be incorporated into the advertisement as well. One or more embodiments can dynamically modify the advertisement, both in terms of appearance and location, to be contextually integrated within the hosting composition. In one or more embodiments, the advertisement can dynamically modify itself. In other embodiments, a computing device can dynamically modify the advertisement. As such, the advertisements can appear less like advertisements, without requiring any of the above-described manual modification of the advertisements.

In view of the above, the advertisements of one or more embodiments can dynamically adapt to the surrounding elements of the hosting digital composition. With one or more embodiments, the advertisement can incorporate determined characteristics of the surroundings, on any platform, and the advertisement can dynamically adapt its appearance and location on the hosting digital composition in accordance with the determined characteristics.

One or more embodiments can visually integrate the digital advertisement with the surrounding elements that are presented on the hosting composition. For example, one or more embodiments can dynamically modify the appearance of Hypertext Markup Language (HTML) advertisements that are to be visually integrated with the surrounding elements that are presented within HTML hosting compositions.

One or more embodiments can use JavaScript functionality (such as, for example, a Window.getComputedStyle( ) method) to determine Cascading Style Sheet (CSS) properties to display on the hosting pages. The Window.getComputedStyle( ) method can be used on a plurality of elements of the hosting digital composition. In order to determine color information of images (and thus incorporate the color information into the advertisements), one or more embodiments can use application programming interfaces (such as, for example, an HTML Canvas Application Programming Interface (API)) to ascertain color information at the pixel level. One or more embodiments can ascertain statistics relating to the fonts that are used by counting the characters that use each font type, and one or more embodiments can collect statistics relating to colors by estimating the number of pixels that use each color.

One or more embodiments can generate style clusters. A style cluster can be a set of stylistic elements that are associated with each other. For example, a style cluster can be colors, fonts, images, etc. that appear together within at least at a portion of the hosting digital composition. Within style clusters, fonts can be grouped by font families and or font sizes, and colors can be grouped by determined Red-Green-Blue (RGB) values. Dominant style clusters can be style clusters that are used most often within the hosting composition. One or more embodiments can ascertain one or more dominant style clusters and can modify the advertisements in accordance with the one or more dominant style clusters.

The determined dominant clusters can then be used to determine the stylistic elements that are to be incorporated into the advertisement. For example, one or more embodiments can determine a font family that is most frequently displayed in the hosting composition, and the determined font family can be dynamically applied to the advertisement.

Once one or more embodiments can determine a set of dominant colors that is used by a host composition, the embodiments can then apply the determined dominant colors to the advertisement so that the colors of the advertisement can match/harmonize with the hosting composition's dominant colors. One or more embodiments can use various strategies to select harmonizing colors, complementary colors, similar colors, similar shades, and/or contrasting shades for the advertisements in order to blend the colors of the advertisements with the colors of the hosting digital composition.

When applying stylistic elements to advertisements, for HTML advertisements and an HTML hosting composition, one or more embodiments can apply the stylistic elements to advertisements with Cascading Style Sheets. For advertisements that contain images, one or more embodiment can programmatically adjust the hue of the images of the advertisements to match/harmonize with the hosting composition's dominant colors.

One or more embodiments can also semantically integrate advertisements within hosting digital compositions. In order to define a preferred placement for an advertisement, one or more embodiments determine a placement based on a determined document semantic structure of the hosting digital composition.

For example, one or more embodiments can inspect a Document Object Model (DOM) of the hosting page in order to determine an underlying semantic structure of the hosting page. By using information contained within tags, such as HTML5 tags (e.g., a main tag, a section tag, a header tag, an aside tag, etc.), one or more embodiments can determine a preferred location to place/arrange an advertisement. One or more embodiments can determine the preferred location based on an analysis of the structure of the hosting page. For example, one or more embodiments can analyze the structure of the hosting page to determine areas of sufficient size to accommodate placement of the advertisement. The advertisement can have specified dimensions, as described in more detail below.

In addition to parsing/inspecting information of the hosting digital composition, one or more embodiments can also determine characteristics of the advertisement that is to be located within the hosting digital composition. For example, one or more embodiments can determine a width, height, and/or a relative level/elevation compared to other elements (i.e., a z-index) of the advertisement. One or more embodiments can generate a list of locations/slots within the digital composition that can be used as areas where the advertisement can appear on the digital composition. Based on the determined semantic structure information of the host digital composition, one or more embodiments can determine a preferable location to display the digital advertisement.

The preferable location for placement of the advertisement can be a location that is determined based on a combination of one or more of the following factors. The preferable location can be a location that maximizes visibility (and this location could possibly change as the viewer scrolls). The preferable location can be a location that maximizes a color harmony score based on the visual blending that is described above. The preferable location can be a location that best matches the advertisement's size. The preferable location can be a location that fits within the semantic structure of the hosting digital composition. One or more embodiments can determine that within a section tag, an advertisement is not to be placed between a section header and section contents. With one or more embodiments, the advertisement is placed at the end of the section if the section is large enough to fit the advertisement. Further, one or more embodiments can determine that a large banner-like advertisement should not be placed in a side tag because the width of such content space is not large enough to accommodate the banner-like advertisement.

FIG. 1 depicts a flowchart of a method in accordance with one or more embodiments. The method of FIG. 1 can be performed by a controller of a system that is configured to visually and/or semantically integrate a digital advertisement within a digital composition. The method of FIG. 1 can also be performed by a processor of an application server that provides digital advertising. The application server can be a special-purpose application server that performs the specific functionality illustrated by FIG. 1. The method of FIG. 1 can also be performed by a processor of a computer system that displays the digital composition. As described above, this processor can be a special-purpose processor for displaying advertisements within a digital composition. The method includes, at block 110, determining, by a controller/processor, characteristics of a hosting digital composition. The digital composition hosts a digital advertisement. The method also includes, at block 120, dynamically modifying at least one characteristic of the digital advertisement based at least on the determined characteristics of the hosting digital composition to create a modified digital advertisement. The modifying the at least one characteristic of the digital advertisement configures the digital advertisement to be visually and/or semantically integrated within the hosting digital composition. The method also includes, at block 130, displaying the modified digital advertisement within the hosting digital composition.

Figure 2:
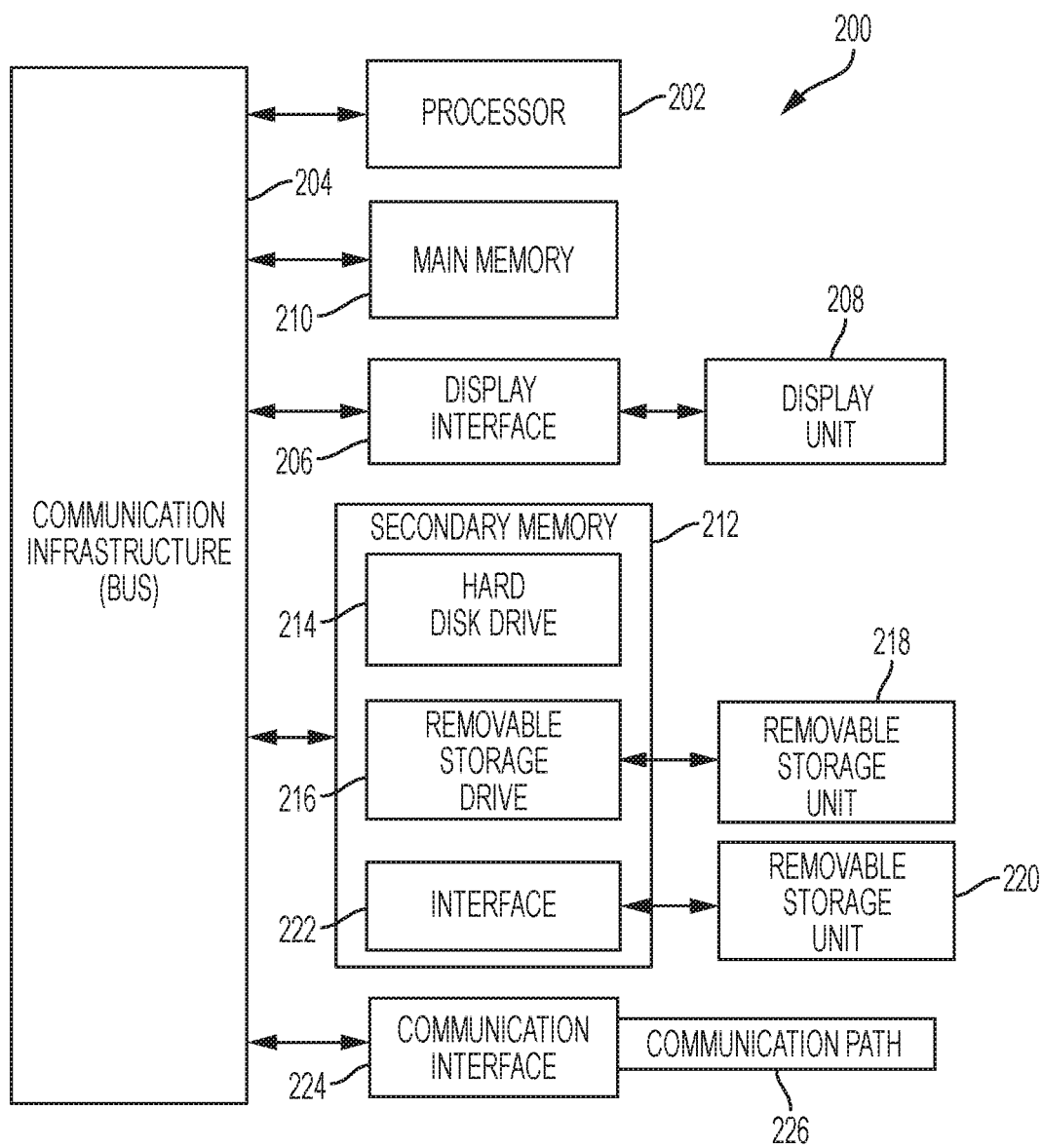
FIG. 2 depicts a high-level block diagram of a computer system, which can be used to implement one or more embodiments.

FIG. 2 depicts a high-level block diagram of a computer system 200, which can be used to implement one or more embodiments. Computer system 200 can correspond to, at least, an advertisement application server, for example. Computer system 200 can be used to implement hardware components of systems capable of performing methods described herein. Although one exemplary computer system 200 is shown, computer system 200 includes a communication path 226, which connects computer system 200 to additional systems (not depicted) and can include one or more wide area networks (WANs) and/or local area networks (LANs) such as the Internet, intranet(s), and/or wireless communication network(s). Computer system 200 and additional system are in communication via communication path 226, e.g., to communicate data between them.

Computer system 200 includes one or more processors, such as processor 202. Processor 202 is connected to a communication infrastructure 204 (e.g., a communications bus, cross-over bar, or network). Computer system 200 can include a display interface 206 that forwards graphics, textual content, and other data from communication infrastructure 204 (or from a frame buffer not shown) for display on a display unit 208. Computer system 200 also includes a main memory 210, preferably random access memory (RAM), and can also include a secondary memory 212. Secondary memory 212 can include, for example, a hard disk drive 214 and/or a removable storage drive 216, representing, for example, a floppy disk drive, a magnetic tape drive, or an optical disc drive. Hard disk drive 214 can be in the form of a solid state drive (SSD), a traditional magnetic disk drive, or a hybrid of the two. There also can be more than one hard disk drive 214 contained within secondary memory 212. Removable storage drive 216 reads from and/or writes to a removable storage unit 218 in a manner well known to those having ordinary skill in the art. Removable storage unit 218 represents, for example, a floppy disk, a compact disc, a magnetic tape, or an optical disc, etc. which is read by and written to by removable storage drive 216. As will be appreciated, removable storage unit 218 includes a computer-readable medium having stored therein computer software and/or data.

In alternative embodiments, secondary memory 212 can include other similar means for allowing computer programs or other instructions to be loaded into the computer system. Such means can include, for example, a removable storage unit 220 and an interface 222. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 220 and interfaces 222 which allow software and data to be transferred from the removable storage unit 220 to computer system 200.

Computer system 200 can also include a communications interface 224. Communications interface 224 allows software and data to be transferred between the computer system and external devices. Examples of communications interface 224 can include a modem, a network interface (such as an Ethernet card), a communications port, or a PC card slot and card, a universal serial bus port (USB), and the like. Software and data transferred via communications interface 224 are in the form of signals that can be, for example, electronic, electromagnetic, optical, or other signals capable of being received by communications interface 224. These signals are provided to communications interface 224 via a communication path (i.e., channel) 226. Communication path 226 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 210 and secondary memory 212, removable storage drive 216, and a hard disk installed in hard disk drive 214. Computer programs (also called computer control logic) are stored in main memory 210 and/or secondary memory 212. Computer programs also can be received via communications interface 224. Such computer programs, when run, enable the computer system to perform the features discussed herein. In particular, the computer programs, when run, enable processor 202 to perform the features of the computer system. Accordingly, such computer programs represent controllers of the computer system. Thus it can be seen from the foregoing detailed description that one or more embodiments provide technical benefits and advantages.

Figure 3:
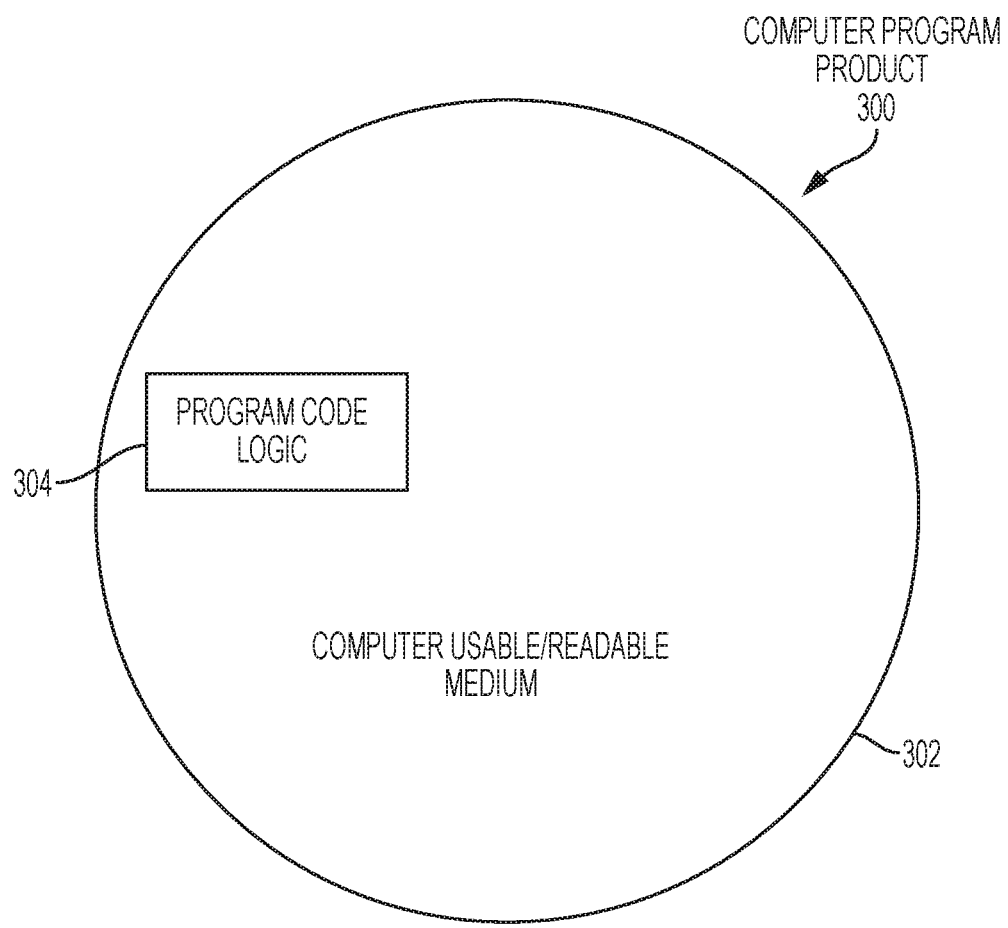
FIG. 3 depicts a computer program product, in accordance with one or more embodiments.

FIG. 3 depicts a computer program product 300, in accordance with an embodiment. Computer program product 300 includes a computer-readable storage medium 302 and program instructions 304.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method, the method comprising:
    determining, via a processor, characteristics of a first hosting digital composition, wherein the first hosting digital composition hosts a first digital advertisement, wherein the characteristics of the first hosting digital composition includes a list of locations within the first hosting digital composition where the first digital advertisement can appear, and wherein the list of locations is based on an underlying semantic structure information of the first hosting digital composition;
    dynamically modifying a cascading style sheets configuration of the determined characteristics of the first hosting digital composition to modify at least one characteristic of the first digital advertisement; and
    generating a second hosting digital composition with an adapted digital advertisement based at least on the determined characteristics of the first hosting digital composition, wherein modifying the at least one characteristic comprises:
        determining an underlying semantic structure of the first hosting digital composition by analyzing a document object model of the first hosting digital composition to determine one or more HTML5 tags indicating a structure of the first hosting digital composition;
        determining a preferred location to place the adapted digital advertisement based on the structure; and
        placing the adapted digital advertisement in the second hosting configuration at the preferred location, wherein the second hosting digital composition is different from a configuration of the first hosting digital composition, wherein the preferred location is determined based on a size of the adapted digital advertisement relative to the structure of the first hosting digital composition;
    displaying the adapted digital advertisement within the second hosting digital composition.

2. The computer-implemented method of claim 1, wherein the determining the characteristics of the first hosting digital composition comprises determining at least one stylistic element of the first hosting digital composition, and wherein the modifying comprises modifying the first digital advertisement by incorporating the at least one stylistic element into the first digital advertisement.

3. The computer-implemented method of claim 2, wherein the at least one stylistic element comprises at least one of a color, a font, and an image of the first hosting digital composition.

4. The computer-implemented method of claim 1, wherein the determining the characteristics of the first hosting digital composition comprises determining at least one semantic characteristic of the first hosting digital composition.

5. The computer-implemented method of claim 4, wherein the determining the at least one semantic characteristic of the first hosting digital composition is based at least on the underlying semantic structure of the first hosting digital composition.

6. The computer-implemented method of claim 1, wherein the determining the characteristics of the first hosting digital composition comprises parsing information of the first hosting digital composition.

7. The computer-implemented method of claim 1, wherein the first hosting digital composition comprises a Hypertext Markup Language-based hosting digital composition, and the advertisement comprises a Hypertext Markup Language advertisement.

8. A computer system comprising:
a memory; and
a processor system communicatively coupled to the memory;
the processor system configured to perform a method comprising:
determining characteristics of a first hosting digital composition, wherein the first hosting digital composition hosts a first digital advertisement, wherein the characteristics of the first hosting digital composition includes a list of locations within the first hosting digital composition where the first digital advertisement can appear, and wherein the list of locations is based on an underlying semantic structure information of the first hosting digital composition;
dynamically modifying a cascading style sheets configuration of the determined characteristics of the first hosting digital composition to modify at least one characteristic of the digital advertisement;
generating a second hosting digital composition with an adapted advertisement based at least on the determined characteristics of the first hosting digital composition, wherein modifying the at least one characteristic comprises:
determining an underlying semantic structure of the first hosting digital composition by analyzing a document object model of the first hosting digital composition to determine one or more HTML5 tags indicating a structure of the first hosting digital composition;
determining a preferred location to place the adapted digital advertisement based on the structure; and
placing the adapted digital advertisement in the second hosting configuration at the preferred location, wherein the second hosting digital composition is different from a configuration of the first hosting digital composition, wherein the preferred location is determined based on a size of the adapted digital advertisement relative to the structure of the first hosting digital composition;
displaying the adapted digital advertisement within the second hosting digital composition.

9. The computer system of claim 8, wherein the determining the characteristics of the first hosting digital composition comprises determining at least one stylistic element of the first hosting digital composition, and wherein the modifying comprises modifying the digital advertisement by incorporating the at least one stylistic element into the first digital advertisement.

10. The computer system of claim 9, wherein the at least one stylistic element comprises at least one of a color, a font, and an image of the first hosting digital composition.

11. The computer system of claim 8, wherein the determining the characteristics of the first hosting digital composition comprises determining at least one semantic characteristic of the first hosting digital composition.

12. The computer system of claim 11, wherein the determining the at least one semantic characteristic of the first hosting digital is based at least on the underlying semantic structure of the first hosting digital composition.

13. The computer system of claim 8, wherein the determining the characteristics of the first hosting digital composition comprises parsing information of the first hosting digital composition.

14. The computer system of claim 8, wherein the first hosting digital composition comprises a Hypertext Markup Language-based hosting digital composition, and the advertisement comprises a Hypertext Markup Language advertisement.

15. A computer program product comprising a non-transitory computer-readable storage medium having program instructions embodied therewith, the program instructions readable by a processor system to cause the processor system to:
determine characteristics of a first hosting digital composition, wherein the first hosting digital composition hosts a first digital advertisement, wherein the characteristics of the first hosting digital composition includes a list of locations within the first hosting digital composition where the first digital advertisement can appear, and wherein the list of locations is based on an underlying semantic structure information of the first hosting digital composition;
dynamically modify a cascading style sheets configuration of the determined characteristics of the first hosting digital composition to modify at least one characteristic of the digital advertisement;
generate a second hosting digital composition with an adapted digital advertisement based at least on the determined characteristics of the first hosting digital composition, wherein modifying the at least one characteristic comprises:
determining an underlying semantic structure of the first hosting digital composition by analyzing a document object model of the first hosting digital composition to determine one or more HTML5 tags indicating a structure of the first hosting digital composition;
determining a preferred location to place the adapted digital advertisement based on the structure; and
placing the adapted digital advertisement in the second hosting configuration at the preferred location, wherein the second hosting digital composition is different from a configuration of the first hosting digital composition, wherein the preferred location is determined based on a size of the adapted digital advertisement relative to the structure of the first hosting digital composition;

display the adapted digital advertisement within the second hosting digital composition.

16. The computer program product of claim 15, wherein the determining the characteristics of the first hosting digital composition comprises determining at least one stylistic element of the first hosting digital composition, and wherein the modifying comprises modifying the digital advertisement by incorporating the at least one stylistic element into the first digital advertisement.

17. The computer program product of claim 16, wherein the at least one stylistic element comprises at least one of a color, a font, and an image of the first hosting digital composition.

18. The computer program product of claim 15, wherein the determining the characteristics of the first hosting digital composition comprises determining at least one semantic characteristic of the first hosting digital composition.

19. The computer program product of claim 18, wherein the determining the at least one semantic characteristic of the first hosting digital composition is based at least on the underlying semantic structure of the first hosting digital composition.

20. The computer program product of claim 15, wherein the determining the characteristics of the first hosting digital composition comprises parsing information of the first hosting digital composition.

* * * * *